United States Patent [19]

Wyss et al.

[11] 3,857,918
[45] Dec. 31, 1974

[54] METHOD FOR PREPARING BRICK PANELS

[75] Inventors: Rudolf F. Wyss, Wadenswil, Switzerland; Dallas G. Grenley, Midland, Mich.

[73] Assignee: The Dow Chemical Company, Midland, Mich.

[22] Filed: Aug. 16, 1973

[21] Appl. No.: 389,040

Related U.S. Application Data

[63] Continuation of Ser. No. 182,155, Sept. 20, 1971, abandoned.

[52] U.S. Cl. ................................. 264/261, 264/333
[51] Int. Cl. ........................ B28b 3/00, B28b 23/00
[58] Field of Search ...................... 264/35, 261, 333

[56] References Cited
UNITED STATES PATENTS

| | | | |
|---|---|---|---|
| 2,613,423 | 10/1952 | Davis | 264/261 |
| 2,825,221 | 3/1958 | Brouk | 264/261 |
| 3,060,640 | 10/1962 | Harris | 264/261 |
| 3,177,273 | 4/1965 | Fingerhut et al. | 264/261 |
| 3,203,069 | 8/1965 | Wogulis et al. | 264/261 |

FOREIGN PATENTS OR APPLICATIONS

| | | | |
|---|---|---|---|
| 967,587 | 8/1964 | Great Britain | 264/333 |
| 1,147,104 | 4/1969 | Great Britain | 264/261 |

*Primary Examiner*—Robert F. White
*Assistant Examiner*—Gene Auville
*Attorney, Agent, or Firm*—Ronald G. Brookens

[57] ABSTRACT

An improvement in the process for preparing prefabricated building panels by arranging a plurality of bricks on a substantially horizontal bed and filling the spaces between the bricks with a flowable mortar wherein the improvement comprises using a vinylidene chloride polymer latex-modified portland cement mortar composition as the flowable mortar, then applying pressure along the panel sufficient to compress the mortar in an amount of from about 1 to 2 millimeters substantially uniformly throughout the panel, wherein such pressure is applied prior to initial setting of the mortar.

3 Claims, No Drawings

METHOD FOR PREPARING BRICK PANELS

CROSS-REFERENCE TO RELATED APPLICATION

This is a continuation, of application Ser. No. 182,155 filed Sept. 20, 1971 now abandoned.

BACKGROUND OF THE INVENTION

It is known to prepare building panels by arranging a plurality of bricks in a predetermined pattern spaced apart from one another on a substantially horizontal bed forming part of a mold, then filling the spaces between the brick with a flowable mortar and allowing such mortar to set; followed by tilting the panel to a generally upright position and removing it from the mold; e.g., as set forth in British Pat. No. 1,147,104.

It is also known to prepare cement mortar compositions modified with vinylidene chloride polymer latexes to enhance the bond strengths and solvent resistance of such mortars, as disclosed by British Pat. No. 967,587.

The utilization of such vinylidene chloride polymer latex-modified cement mortar compositions in the prefabricated building panel art wherein such panels are prepared while in a substantially horizontal position, has not been disclosed. The prior art further fails to suggest that significantly enhanced bond strength between the mortar and the brick and unexpectedly high flexural strengths of the total structure are obtainable utilizing such latex-modified cement mortar compositions in conjunction with the pressurization step comprising the present invention.

SUMMARY

It has been discovered, which discovery forms the present invention, that utilization of certain vinylidene chloride polymer cement mortars as the flowable mortar in a process comprising the preparation of building panels by arranging a plurality of bricks spaced apart on a substantially horizontal bed which bed advantageously forms part of a mold, where the spaces between the bricks are filled with a flowable mortar capable of curing sufficiently to retain the bricks in their assembled relation; followed by the application of pressure substantially uniformly along the surfaces of the panels, such pressure being sufficient to compress the flowable mortar in an amount of from about 1 to 2 millimeters substantially uniformly throughout the panel, where such pressure is applied prior to and at least until the occurrence of the initial set of the mortar, unexpectedly provides significantly enhanced bond and flexural strengths in such panels upon curing of the mortar constituent.

DESCRIPTION OF THE PREFERRED EMBODIMENTS

Throughout this specification, it is to be understood that the term "bricks" refers to any structural unit of regular shape whether made of a fired refractory material or masonry, and thus includes in its scope items such as blocks and tiles as well as bricks in the narrow sense of the term. The brick elements can be used as a nonload-bearing facade or as a load-bearing wall, both of which can be insulated or non-insulated as desired.

The vinylidene chloride polymer latex-modified cement mortar compositions which are useful in the process of the present invention include those compositions comprising a mixture, on an absolute volume basis, of (1) about 100 parts of cement, (2) between about 200 and 1,000 parts of a mineral aggregate, (3) between about 30 and 170 parts of water and (4) between about 8 and 170 parts of a vinylidene chloride polymer latex.

The cement referred to may be selected from the group of inorganic settable materials, such as hydraulic, portland, natural, or aluminous cement.

The mineral aggregate used may be stone, gravel, pebbles, granite, carborundum, aluminum oxide, emery, marble chips, sawdust cinders or other aggregate commonly employed in cement mortars. The intended end use of the mortar can undoubtedly serve as a guide to those skilled in the art as to the choice of preferred particle size of the aggregate material to be included in the improved latex-modified mortars of the present invention.

By the term "latex" as used herein is meant any aqueous colloidal dispersion of the interpolymeric thermoplastic, resinous substances described herein.

Exemplary of such interpolymerizable monomeric materials are: methyl acrylate, ethyl acrylate, propyl acrylate, isopropyl acrylate, butyl acrylate, isobutyl acrylate, sec-butyl acrylate, tert-butyl acrylate, amyl acrylate, isoamyl acrylate, tert-amyl acrylate, hexyl acrylate, 2-ethylhexyl acrylate, cyclohexyl acrylate, octyl acrylate, 3,5,5-trimethylhexyl acrylate, decyl acrylate, dodecyl acrylate, octadecnyl acrylate, methyl methacrylate, ethyl methacrylate, 2-ethylbutyl methacrylate, octyl methacrylate, phenyl methacrylate, cyclohexyl methacrylate, 3,5,5-trimethylhexyl methacrylate, decyl methacrylate, dodecyl methacrylate, and octadecyl methacrylate and butyoxyethyl acrylate or methacrylate or other alkoxyethyl acrylates or methacrylates, vinyl halides (e.g., vinyl chloride, vinyl bromide, etc.), acrylonitrile, methacrylonitrile, and the like.

Representative types of water-insoluble vinylidene chloride-containing interpolymer latexes which have been discovered to be highly satisfactory as the latex components employed in the latex-modified portland cement mortar compositions used in the present invention include the following interpolymer latexes designated in the following Table I.

TABLE I

Vinylidene Chloride-Containing Interpolymer Latex Compositions

| Organic Monomer Components | Percent by Weight | | | | | | | | | | | |
|---|---|---|---|---|---|---|---|---|---|---|---|---|
| Vinylidene Chloride | 40 | 60 | 89 | 90 | 50 | 88 | 50 | 52 | 70 | 75 | 75 | 75 |
| Vinyl Chloride | | | | | | | 40 | 35 | 20 | 20 | 20 | 20 |
| Ethyl Acrylate | 60 | 40 | | | 40 | 7 | 10 | | 10 | 5 | | 3 |
| Methyl Methacrylate | | | | 10 | 10 | | | | | | | 2 |
| 2-Ethylhexyl Acrylate | | | | | | | | 13 | | | | |
| Acrylonitrile | | | 11 | | | 5 | | | | | 5 | |

Of particular benefit is the interpolymer latex containing about 75 percent by weight of interpolymerized vinylidene chloride, about 20 percent by weight of interpolymerized vinyl chloride, about 3.0 percent by weight of interpolymerized ethyl acrylate, and about 2.0 percent by weight of interpolymerized methyl methacrylate.

The initial preparation of the building panel may be accomplished utilizing any technique known to the art, e.g., any procedure wherein a plurality of bricks are arranged in a predetermined manner, spaced apart from one another on a substantially horizontal bed and where the spaces between the bricks are filled with a flowable, subsequently curable, mortar.

The horizontal bed member may advantageously form part of an adjustable mold, e.g., by utilization of a bed member affording a flat upper surface, in combination with an adjustable frame assembly wherein such assembly can be substantially uniformly tightened against the panel to provide the required pressure, prior to initial set of the mortar. As indicated, the applied pressure must be sufficient to compress the flowable mortar substantially uniformly throughout the panel, without causing displacement of the mortar from between adjacent brick surfaces. The amount of pressure will vary with and be determined by, the particular rheology of the mortar composition used. Further, it is critical in the present invention that such pressure be applied prior to, and at least until, the occurrence of the initial set of said flowable mortar. "Initial set" is defined herein as meaning that condition as determined using ASTM standard test methods C-254 or C-403, and, although incapable of exact numerical definition, is a property well known and recognized in the art.

Following the initial set of the mortar, the pressure may be released or maintained as desired and the mortar composition is cured at normal room temperatures or at elevated temperatures, with the panel maintained either in a substantially horizontal position or while tilted in a vertical direction. Panels prepared by this technique have significantly enhanced bond and flexural strengths as contrasted to panels prepared as described herein but where the panel was not subjected to the prescribed applied pressure (as illustrated by the comparative data set forth in the following Example). The cured panels can then be stored and/or transported to the job site while in a vertical position permitting maximum use of available storage or shipping space.

The following nonlimiting example, wherein all parts and percentages are by weight, illustrates the present invention.

EXAMPLE

A prefabricated brick wall element was prepared by arranging a plurality of bricks in a predetermined pattern spaced apart from one another on a substantially horizontal bed having a facing layer of a resilient material, e.g., polyurethane foam, wherein such bed formed part of a mold, i.e., wherein the outer edges of the bed were separately adjustable so as to apply pressure substantially uniformly inwardly along the surfaces of the element.

Thereafter, a flowable mortar of the following composition was poured into the spaces between the bricks forming the wall element.

FORMULATION

| Material | Parts by Volume |
| --- | --- |
| Portland cement | 100 |
| Water | 30 |

FORMULATION-Continued

| Material | Parts by Volume |
| --- | --- |
| Sand | 210 |
| Marble dust (filler) | 50 |
| Interpolymer latex (50% solids) | 34 |
| 75 wt. parts vinylidene chloride | (Based on interpolymer solids) |
| 20 wt. parts vinyl chloride | |
| 3 wt. parts ethyl acrylate | |
| 2 wt. parts methyl methacrylate | |
| .4 wt. parts silicone antifoamer | |
| 6 wt. parts nonionic surfactant | |

Following addition of the mortar, and prior to the initial set thereof, pressure was applied uniformly along the bed in an amount sufficient to cause the mortar within the spaces between the bricks to be compressed to an extent of from about 1 to 2 millimeters.

After application of pressure resulting in the compaction of the mortar the wall element was allowed to stand under pressure until initial set of the mortar occurred (generally after about 30 minutes), then the element was tilted into a vertical position and transported to a curing oven wherein it was cured, while in a vertical position, for several hours at a temperature of about 30°C. under 50 percent relative humidity. The cured wall element was then removed from the curing oven and again lowered to a horizontal position for determination of bond and flexural strength. Flexural strengths of from 20 to 50 Kg/cm.$^2$ were observed by random testing throughout the wall element, with no evidence of failure of bond strength, i.e., no cracks in the mortar joint, while the element was being removed from the oven prior to testing.

By way of comparison, a wall element prepared identically as described herein but wherein the pressurization step (following addition of the mortar) was omitted, was characterized by flexural strengths of less than 15 Kg/cm.$^2$ and exhibited considerable cracking within the mortar joints during removal from the curing oven.

What is claimed is:

1. In the method of making building panels consisting of individual bricks held together solely with mortar, such method comprising the steps of arranging a plurality of bricks in a predetermined pattern spaced apart from one another on a substantially horizontal bed, forming a mold for said panels filling the spaces between the bricks with a flowable mortar, allowing the mortar to set to an extent sufficient to retain the bricks in their assembled relation and removing the panel from the mold; the improvement consisting of (1) utilizing as said mortar a vinylidene chloride polymer latex-modified portland cement mortar composition wherein said mortar composition comprises on an absolute volume basis (1) about 100 parts of portland cement, (2) between about 200 and 1,000 parts of a mineral aggregate, (3) between about 30 and 170 parts of water and (4) between about 8 and 170 parts of said vinylidene chloride polymer latex, and wherein said vinylidene chloride polymer is composed of from about 35 to about 90 percent by weight of vinylidene chloride and from about 65 to about 10 percent by weight of at least one other interpolymerizable monomer, as based on polymer solids, said other interpolymerizable monomer being composed of at least one monomer of the general formula

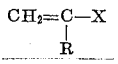

wherein R is selected from the group consisting of hydrogen and the methyl group and X is selected from the group consisting of —CN, halogen of atomic numbers 9 to 35, and ester forming groups, —COOY, wherein Y is selected from the group consisting of a primary alkyl group and a second alkyl group, each of the foregoing alkyl groups containing from 1 to 18 carbon atoms, and (2) applying pressure substantially uniformly throughout said panels by adjusting the sides of said mold inwardly, said pressure being sufficient to compress said mortar substantially uniformly throughout said panels in an amount between about 1 and 2 millimeters without causing displacement of said mortar from between adjacent brick surfaces said pressure being applied prior to and at least until the occurrence of the initial set of said mortar as determined by standard ASTM test methods C-254 or C-403.

2. The process of claim 1 wherein said vinylidene chloride polymer is an interpolymer of vinylidene chloride, vinyl chloride, ethyl acrylate and methyl methacrylate.

3. The process of claim 2 wherein said vinylidene chloride polymer is an interpolymer of about 75 percent by weight vinylidene chloride, about 20 percent by weight of vinyl chloride, about 3 percent by weight of ethyl acrylate and about 2 percent by weight methacrylate.

* * * * *